United States Patent Office 3,634,350
Patented Jan. 11, 1972

3,634,350
DIAPHRAGM FROM A VULCANIZABLE BLEND OF POLYSULFIDE POLYMER AND POLYEPICHLOROHYDRIN
Nevison G. Loraine and Robert J. Butterfield, Newcastle-upon-Tyne, England, assignors to George Angus & Company Limited, Newcastle-upon-Tyne, England
No Drawing. Filed July 2, 1969, Ser. No. 838,578
Claims priority, application Great Britain, July 9, 1968, 32,770/68
Int. Cl. C08g 43/02
U.S. Cl. 260—18
4 Claims

ABSTRACT OF THE DISCLOSURE

A synthetic rubber diaphragm, which is flexible over a wide temperature range and resistant to petroleum, is made from a composition based on a blend of (A) polysulphide rubber and (B) epichlorohydrin rubber of which the preferred proportions, for a carburettor diaphragm, are (A) 65 parts: (B) 35 parts by weight.

DESCRIPTION

This invention relates to diaphragms and provides thin flexible diaphragms of a synthetic rubber composition, which is flexible over a wide temperature range and is resistant to the solvent or other deleterious effects of fluids such as petroleum liquids or vapour.

The invention is applicable to any thin flexible diaphragm likely to encounter such fluids, for example in a pump, but it is particularly concerned with and will be described as applied to a long stroke or rolling diaphragm such as is used in a carburettor of an internal combustion engine and which is exposed to air at one side of the diaphragm and petrol or other fuel vapour at the other side.

The fuel may have a high aromatic content, and may contain acetone or alcohol, which the diaphragm must resist with minimum swelling and shrinkage. Resistance to shrinkage is particularly important, so as to maintain dimensional stability after the diaphragm has been in use, has dried after dismantling, for example for servicing of a carburettor, and has then to be re-assembled.

The diaphragm must have an economic working life, without cracking or splitting, under flexing or rolling conditions over a wide temperature range from about −40° C., in extremely cold weather, up to about 60° C., on a working engine. For sufficient flexibility a hardness of about 50° B.S. is preferred.

Current practice is to mould the diaphragms and a synthetic rubber composition which meets the operating requirements must also be suitable for economic mixing, blanking and moulding.

The composition must also flow easily in the mould so that very thin web or wall sections can be moulded, for example of 0.4 mm. thickness.

In considering suitable materials, natural rubber and certain synthetic rubbers, such as butadiene-styrene copolymer, ethylene propylene and silicone rubbers must be excluded because they do not resist petrol and polychloroprene is unsatisfactory because it is not sufficiently resistant to petrol.

Polyurethane rubbers have been found unsuitable because of limited heat resistance and liability to hydrolytic deterioration.

Consideration has been given to the use of a fluoroelastomer, such as a copolymer of vinylidene fluoride and perfluoropropylene, which is petrol-resistant but is costly and, in any event, is unsuitable at low temperature and difficult to process in formulations to give the required low hardness value.

Nitrile rubber compositions, based on butadiene-acrylic nitrile copolymer, have been found reasonably satisfactory but to achieve the preferred hardness of about 50° B.S. a very high plasticiser content is required and this is liable to cause excessive shrinkage of the diaphragm in use. To resist such shrinkage, peripheral metal rings have been moulded into diaphragm rims but this is troublesome and costly and even then cracks and splits appear and unduly limit the working life of such diaphragms.

Epichlorohydrin rubbers, such as are known by the trademark "Hydrin," behave similarly to nitrile rubber but do not have sufficient resistance to petrol.

Polysulphide rubber, such as is known by the trademark "Thiokol," has been found to be an acceptable alternative to nitrile rubber, in so far as resistance to petrol and flexibility at low temperature are concerned, but it is difficult to process in manufacturing diaphragms, and the scrap rate is high. With compositions of polysulphide rubber, to give the required low hardness value, the "knitting" characteristics, required to produce homogenous mouldings, are poor, a long period under pressure in the mould with most careful temperature control is necessary, die contamination is high, and the hot strength of mouldings, i.e. while still hot from the mould, is low so that splits and distortions are likely to occur.

However, in spite of the above difficulties, polysulphide rubber is used in the absence of anything superior.

In an effort to solve the problem by combining different materials, to retain required properties and compensate for deficiencies, blends of polysulphide rubber with nitrile rubber or with polychloroprene have been tried without success.

Surprisingly however, we have found that polysulphide rubber and epichlorohydrin rubber are compatible for blending in a suitable composition which meets the manufacturing and performance requirements for moulded thin flexible diaphragms for carburettors. Obviously equivalent requirements for other diaphragms for similar conditions could equally be met.

According to the invention therefore, a diaphragm which is flexible over a wide temperature range and resistant to the solvent action of petroleum is made from a synthetic rubber composition of which the rubber content is a blend of (A) polysulphide rubber and (B) epichlorohydrin rubber.

By "polysulphide rubber" is meant a synthetic rubber, well known by the trademark "Thiokol," which is a condensate of sodium polysulphide with an organic dihalide, for instance ethylene dichloride or di-2-chloroethyl formal or a combination thereof.

By "epichlorohydrin rubber" is meant a synthetic rubber consisting essentially of a polymer or copolymer of epichlorohydrin. Such rubbers are available from the B. F. Goodrich Chemical Co., U.S.A., under the trademark "Hydrin," including "Hydrin 200," copolymer of epichlorohydrin and ethylene oxide, specific gravity about 1.27, which is essentially a copolymer of epichlorohydrin with ethylene oxide, and "Hydrin 100," polyepichlorohydrin, specific gravity about 1.36, which is essentially polyepichlorohydrin.

Considerable variation in the relative proportions of the two constituent rubbers is possible but the most useful proportions of the constituents A (polysulphide rubber) and B (epichlorohydrin rubber) in a rubber content of 100 parts by weight are in the ranges:

| | Parts by wt. |
|---|---|
| A | 90–20 |
| B | 10–80 |

For best results, the proportions should lie within the ranges:

| | Parts by wt. |
|---|---|
| A | 80–35 |
| B | 20–65 |

The two rubbers A and B are blended together in the usual way on a mixing mill together with additives, comprising a filler and curing or vulcanising agents, required to provide a vulcanisable composition for the required hardness, which is preferably about 50° B.S. as mentioned above.

For a carburettor diaphragm the composition should have the following general formulation:

| | Parts by wt. |
|---|---|
| (A) Polysulphide rubber | 65 |
| (B) Epichlorohydrin rubber | 35 |
| (C) Filler | 45 |
| (D) Curing (vulcanising) agents for A and B | 11–14 |

As a preferred example, for a carburettor diaphragm, the following specific formulation is given:

(A)

| | Parts by wt. |
|---|---|
| Polysulphide rubber (Thiokol ST [1]) | 65 |

(B)

| | |
|---|---|
| Copolymer of epichlorohydrin with ethylene oxide (Hydrin 200) | 35 |

(C)

| | |
|---|---|
| Carbon black (fine thermal) | 45 |

(D)

| | |
|---|---|
| Red lead | 1.75 |
| Ethylene thiourea | 0.6 |
| Zinc peroxide (40% active) | 10 |

(E)

| | |
|---|---|
| Processing aid (zinc stearate) | 1.5 |

[1] A millable gum elastomer prepared from bis(2-chloroethyl) formal and sodium polysulfide, molecular weight about 80,000.

After compounding in the usual way, the composition is formed into suitable blanks in any convenient manner, such as by slicing from an extruded tube ring blanks which are then moulded in cavities, between upper and lower dies, to form diaphragms. A typical moulding time and temperature is 5½ minutes at 166° C., which can of course be varied, optionally followed by a post-moulding free baking treatment for 2 hours at 150° C. which improves resistance of the material to permanent set.

Diaphragms moulded from the above composition should have a hardness of 48° B.S.

We claim:
1. A diaphragm which is flexible over a wide temperature range of −40° C. to 60° C. and resistant to the solvent action of petrol, and is made from a filled, vulcanized synthetic rubber composition of which the rubber content is a vulcanized blend of (A), a polysulphide polymer and (B) an epichlorohydrin polymer, the proportions of the constituents A and B in a content of 100 parts by weight being in the ranges:
   (A) 90 to 20 parts by weight
   (B) 10 to 80 parts by weight.
2. A diaphragm according to claim 1, in which the ranges are:
   (A) 80 to 35 parts by weight
   (B) 20 to 65 parts by weight.
3. A diaphragm according to claim 2, being a diaphragm for a carburettor of an internal combustion engine and made from a composition having the following general formulation:

| | Parts by wt. |
|---|---|
| (A) Vulcanizable, polysulphide polymer | 65 |
| (B) Vulcanizable, epichlorohydrin polymer | 35 |
| (C) Filler | 45 |
| (D) Vulcanizing agents for A and B | 11–14 |

4. A diaphragm according to claim 3 and made from a composition having the following formulation:

(A)

| | Parts by wt. |
|---|---|
| Vulcanizable, polysulphide polymer | 65 |

(B)

| | |
|---|---|
| Vulcanizable, copolymer of epichlorohydrin with ethylene oxide | 35 |

(C)

| | |
|---|---|
| Carbon black | 45 |

(D)

| | |
|---|---|
| Red lead | 1.75 |
| Ethylene thiourea | 0.6 |
| Zinc peroxide | 10 |

(E)

| | |
|---|---|
| Zinc stearate | 1.5 |

References Cited

UNITED STATES PATENTS

| 2,787,608 | 4/1957 | Gregory et al. | 260—79.1 |
| 3,316,324 | 4/1967 | Mendoyanis | 260—830 |
| 3,351,517 | 11/1967 | Willis | 260—18 |

FOREIGN PATENTS

| 625,153 | 8/1961 | Canada | 260—830 |

DONALD E. CZAJA, Primary Examiner

E. C. RZUCIDLO, Assistant Examiner

U.S. Cl. X.R.

123—139 A; 260—37 NP, 823